United States Patent
Wilson et al.

(10) Patent No.: US 12,282,469 B2
(45) Date of Patent: *Apr. 22, 2025

(54) INDEXING STRUCTURED DATA WITH SECURITY INFORMATION

(71) Applicant: Workday, Inc., Pleasanton, CA (US)

(72) Inventors: Michael Wilson, San Jose, CA (US); Philip Monroe, San Francisco, CA (US); Darius Kasad, San Ramon, CA (US); Tejas Mandke, Emeryville, CA (US); David Vieira, Oakland, CA (US); Vladimir Giverts, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/917,386

(22) Filed: Jun. 30, 2020

(65) Prior Publication Data
US 2021/0004360 A1 Jan. 7, 2021

Related U.S. Application Data

(63) Continuation of application No. 14/814,376, filed on Jul. 30, 2015, now Pat. No. 10,733,162.

(51) Int. Cl.
*G06F 16/22* (2019.01)
*G06F 21/62* (2013.01)
(52) U.S. Cl.
CPC ...... *G06F 16/2228* (2019.01); *G06F 21/6227* (2013.01)
(58) Field of Classification Search
CPC .......................... G06F 16/2228; G06F 21/6227
See application file for complete search history.

(56) References Cited

U.S. PATENT DOCUMENTS

| | | | | |
|---|---|---|---|---|
| 5,335,346 A * | 8/1994 | Fabbio | ................. | G06F 16/289 |
| | | | | 711/163 |
| 5,974,409 A * | 10/1999 | Sanu | ..................... | G06F 16/951 |
| 6,356,897 B1 | 3/2002 | Gusack | | |
| 6,961,849 B1 * | 11/2005 | Davis | ................. | G06Q 20/3829 |
| | | | | 705/76 |
| 7,240,046 B2 * | 7/2007 | Cotner | ................. | G06F 16/284 |
| | | | | 707/999.009 |
| 7,467,133 B2 * | 12/2008 | Subramaniam | ..... | G06F 16/2423 |
| | | | | 707/999.102 |
| 7,512,965 B1 * | 3/2009 | Amdur | ................... | H04L 63/20 |
| | | | | 726/1 |
| 7,599,934 B2 * | 10/2009 | Conlan | ............... | G06F 21/6227 |
| | | | | 707/999.009 |
| 7,711,750 B1 * | 5/2010 | Dutta | ................. | G06F 21/6227 |
| | | | | 707/999.009 |

(Continued)

OTHER PUBLICATIONS

Rask et al., "Implementing Row- and Cell-Level Security in Classified Databases Using SQL Server 2005", Microsoft Corp. (Year: 2005).*

*Primary Examiner* — Debbie M Le
*Assistant Examiner* — Huen Wong
(74) *Attorney, Agent, or Firm* — Van Pelt, Yi & James LLP

(57) ABSTRACT

A system for indexing and searching includes an input interface and a processor. The interface is to receive a request to search for a term. The processor is to determine a search response based at least in part on a security associated with an index field and the term.

20 Claims, 7 Drawing Sheets

(56) References Cited

U.S. PATENT DOCUMENTS

| | | | | |
|---|---|---|---|---|
| 7,831,570 B2* | 11/2010 | Sack | | G06F 21/6227 |
| | | | | 707/694 |
| 7,970,790 B2* | 6/2011 | Yang | | G06F 21/6227 |
| | | | | 707/783 |
| 8,332,430 B2* | 12/2012 | Koide | | H04L 63/0815 |
| | | | | 707/711 |
| 8,805,882 B2* | 8/2014 | Lewis | | G06F 15/16 |
| | | | | 705/346 |
| 8,868,540 B2* | 10/2014 | Ture | | G06F 21/6227 |
| | | | | 707/709 |
| 9,165,044 B2* | 10/2015 | Psenka | | G06F 16/24575 |
| 9,197,668 B2* | 11/2015 | Boucher | | H04L 63/101 |
| 9,342,705 B1 | 5/2016 | Schneider | | |
| 9,720,923 B2* | 8/2017 | Gaikwad | | G06F 16/13 |
| 10,031,978 B1* | 7/2018 | Brette | | G06F 16/9537 |
| 10,073,875 B2* | 9/2018 | Larson | | G06F 16/2228 |
| 10,331,689 B2* | 6/2019 | Sorrentino | | G06F 16/248 |
| 2002/0087500 A1* | 7/2002 | Berkowitz | | G06F 16/2308 |
| 2005/0050083 A1* | 3/2005 | Jin | | G06F 16/2379 |
| | | | | 707/999.102 |
| 2005/0060286 A1 | 3/2005 | Hansen | | |
| 2006/0059144 A1 | 3/2006 | Canright | | |
| 2006/0167850 A1* | 7/2006 | Fish | | G06F 21/6227 |
| 2006/0206485 A1* | 9/2006 | Rubin | | G06F 21/6227 |
| | | | | 707/999.009 |
| 2007/0027840 A1* | 2/2007 | Cowling | | G06F 16/20 |
| 2007/0106639 A1* | 5/2007 | Subramaniam | | G06F 16/2457 |
| 2007/0118504 A1* | 5/2007 | Subramaniam | | G06F 16/9535 |
| 2007/0220004 A1* | 9/2007 | Fifield | | G06Q 10/10 |
| | | | | 707/999.009 |
| 2007/0233685 A1 | 10/2007 | Burns | | |
| 2009/0094193 A1* | 4/2009 | King | | G06F 21/6227 |
| 2010/0106709 A1 | 4/2010 | Imai | | |
| 2011/0113072 A1* | 5/2011 | Lee | | G06F 16/122 |
| | | | | 707/802 |
| 2012/0078859 A1* | 3/2012 | Vaitheeswaran | | G06F 16/951 |
| | | | | 707/693 |
| 2012/0136901 A1* | 5/2012 | Raatikka | | G06F 16/2358 |
| | | | | 707/E17.05 |
| 2012/0317129 A1* | 12/2012 | Qayyum | | G06F 16/288 |
| | | | | 707/E17.069 |
| 2012/0324240 A1 | 12/2012 | Hattori | | |
| 2013/0080466 A1 | 3/2013 | Kliewe | | |
| 2015/0006581 A1 | 1/2015 | Luo | | |
| 2015/0121545 A1 | 4/2015 | Chandrasekaran | | |
| 2016/0191544 A1* | 6/2016 | Kim | | H04L 63/0876 |
| | | | | 713/171 |
| 2016/0337366 A1* | 11/2016 | Wright | | G06F 16/113 |
| 2017/0300712 A1* | 10/2017 | Timmerman | | G06F 16/2456 |
| 2018/0137302 A1* | 5/2018 | Crimm | | H04L 9/088 |

* cited by examiner

INDEXING STRUCTURED DATA WITH SECURITY INFORMATION

This application is a continuation of U.S. patent application Ser. No. 14/814,376, now U.S. Pat. No. 10,733,162, entitled INDEXING STRUCTURED DATA WITH SECURITY INFORMATION filed Jul. 30, 2015 which is incorporated herein by reference for all purposes.

BACKGROUND OF THE INVENTION

A business database system stores business information including personnel information, financial information, technical information, etc. Typical searching of a database system uses an index. However, since many or most items are in the index, a search may return sensitive items in response to a search. The sensitive items, in some cases, are not supposed to be revealed to the user performing the search.

BRIEF DESCRIPTION OF THE DRAWINGS

Various embodiments of the invention are disclosed in the following detailed description and the accompanying drawings.

DETAILED DESCRIPTION

Figure 1:
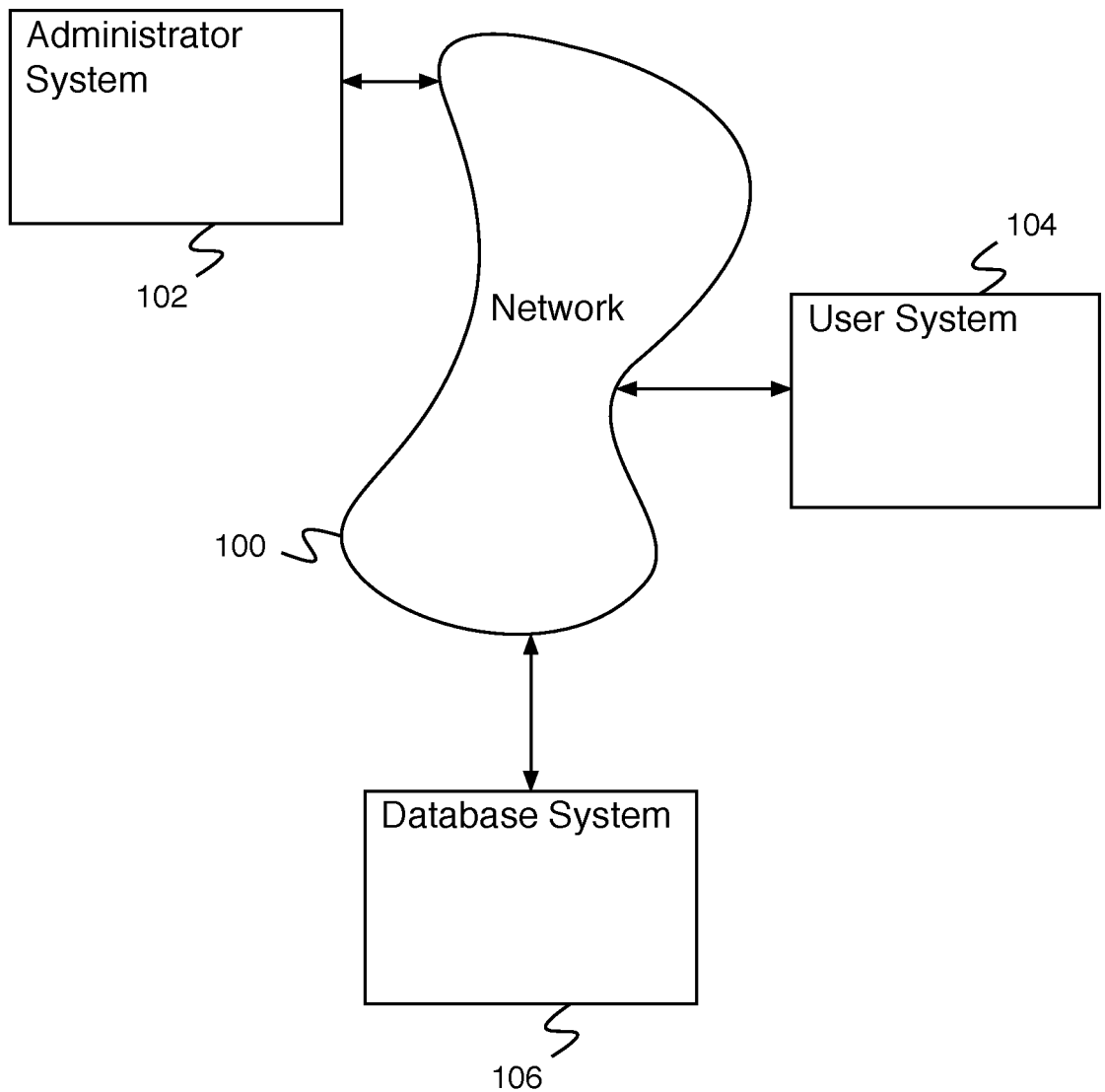
FIG. 1 is a block diagram illustrating an embodiment of an indexing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Indexing structured data with security information is disclosed. A system for indexing comprises an input interface to receive a request to search for a term, and a processor to determine a search response based at least in part on a security associated with an index field and the term. In some embodiments, the system comprises a memory coupled to the processor and configured to provide the processor with instructions.

In some embodiments, a system for indexing structured data with security information comprises a record database and a database search system. The database search system builds a search index from the record database and searches the search index to determine a set of search results. In some embodiments, records stored by the record database comprise hierarchically stored objects, each object comprising one or more record fields. Each record comprises a security policy (e.g., an indication of users that may or may not access the record and/or the manner in which they may or may not access the record). In addition, each record field comprises a security policy. The search index comprises a set of index fields, each index field corresponding to a record field. Each index field comprises a security policy derived from the security policy of the associated record field and the security policy of the record associated with the associated record field. Each index field additionally stores a value corresponding to the value stored by the record field. When a user performs a search, the index is searched for index fields that the user is allowed to access (e.g., according to the security policy) and for values that match the search term.

In some embodiments, a method to provide high performance and highly secure search by indexing and searching structured data based on contextual, user, and role-based security policies of the indexed data and checking against the security privileges of the search user is disclosed. Security is highly configurable and dynamic.

In some embodiments, separate security policies apply to the visibility of the record and to the visibility of its individual fields. In some embodiments, in the event that a search user is not allowed to view a record, they are not presented any information hinting to its existence. In some embodiments, in the event that a search user is allowed to view a record, but not some fields within the record, they are not able to find that record through search using the value for the non-viewable field. In some embodiments, every record of a given type might have different security policies and every record might have multiple security policies. In some embodiments, security policy assignments to records and search user security membership change regularly and those changes need to be reflected in search results as soon as possible.

In some embodiments, to do this indicates that:
  The index includes the security groups needed for that record and its fields as well as those fields' values.
  Security changes are reflected in the index as soon as possible after the change.
  When a user invokes a search, the set of security groups the user is a member of are included in the search query.

In the event that a user's security settings change, this is reflected in the search results on the next search after the change.

A list of the user's security groups is included with the query expression to compare against the security groups authorized for the record and its fields.

In some embodiments, there are many different security group types that are all accounted for in the indexing and search solution. These can include two basic forms and an aggregated form:

Unconstrained access:
  Visibility of a record or field depends on the search user belonging to one of the security groups associated with the record or field.
    e.g. "All Users" (All search users can see this record), or "All Managers" (search users who are in the manager group can see this record), or "Located in Europe" (search users whose location is in Europe can see this record)
  In some embodiments, a security group used for unconstrained access has the form SGn, where n represents an integer.
Constrained access:
  Visibility of a record or field depends on the search user belonging to both security group defined on the record or field as well as matching the additional constraint.
  In some embodiments, a security group SGn has a further constraint with the form SGn_Cm, where n represents an integer, where m represents an integer.
  For example in the constrained access "Employee as Self" (SG123 might represent the Employee as Self security group and 678 might represent an employee number, so SG123_C678 could identify Employee as Self for employee 678).
Aggregation:
  Security based on required membership of multiple security groups. This aggregation can be a combination of Constrained and Unconstrained forms.
    e.g. ("Manager" and "Located in Europe"), or ("Located in US" and "Employee as Self"), or ("Manager" and "Cost center 123")
  In some embodiments, an aggregation where membership must be simultaneously in 2 or more groups is indicated using an ampersand (&) between the security groups (e.g. SGn_Cm)

In various embodiments, a security group comprises a set of users and the access permissions for the set of users. For example, a given user might belong to multiple security groups (e.g., the number of security groups is 1, 2, 3, 4, 5, 10, 20, 50, 100, 200, 1000, or any other number of security groups):

| | | |
|---|---|---|
| john.doe | SG123_C986 | (Employee as Self) |
| | SG54 | (Location = USA) |
| | SG32 | (Manager) |
| | SG143 | (Expense Management) |
| | SG2765 | (Time Off) |
| | SG376 | (Job Profile) |
| anne.smith | SG123_C6987 | (Employee as Self) |
| | SG54 | (Location = USA) |
| | ... | |

In some embodiments, for each record to be indexed, the security groups for the visibility of the record, the values for each field contained within the record, and the security groups corresponding to each instance of each field within the record are stored.

In some embodiments, an example of how the information on a single record is packaged for indexing in a typical inverted index based search engine is as follows:

This example is a record describing a gift with two fields, one for the ID of the gift and another with the Title of the gift. For simplicity, assume a simple tokenization based on splitting on whitespace, ignoring punctuation, and lower-casing alphabetic characters. This is shown here in javascript object notation (JSON) to show the structure of the data to be indexed.

```
{
  "tenant": "super",
  "environment": "dev",
  "sid": "12345", // index definition id for this doc_type
  "docs": [
    {
      "iid": "1111", // id of the record's instance
      "doc_security":"SG2_C5&SG7, SG22, SG33_C4"
      "fields": [
        {
          "iid": "12345$1", // id of "ID" field
          "field_security": "SG2_C5&SG7, SG22"
          "value": "GIFT-16-3"
        },
        {
          "iid": "12345$2", // id of "Title" field
          "field_security": "SG2_C5&SG7, SG22, SG33_C4"
          "value": "HCM Gift 13: HRCORE WATS"
        }
      ]
    }
  ]
}
```

The above example record results in a postings list being created for each of the following values if it does not already exist and the record id (1111) is added to each list:
  (for record visibility):
    12345:SG2_C5&SG7→1111
    12345:SG22→1111
    12345: SG33_C4→1111
  (for the tokenized values of the first indexed field (ID)):
    12345$1:value:"gift"→1111
    12345$1:value:"16"→1111
    12345$1:value:"3"→1111
  (for the security groups of the first indexed field (ID)):
    12345$1:field_security:SG33_C4→1111
    12345$1:field_security:SG2_C5&SG7→1111
  (for the tokenized values of the second indexed field (Title)):
    12345$2:value:"hcm"→1111
    12345$2:value:"gift"→1111
    12345$2:value:"13"→1111
    12345$2:value:"hrcore"→1111
    12345$2:value:"wats"→1111
  (for the security groups of the second indexed field (Title)):
    12345$2:field_security:SG2_C5&SG7→1111
    12345$2:field_security:SG22→1111
    12345$2:field_security:SG33_C4→1111

This record is a simple example showing unconstrained security group access (SG22), constrained security group access (SG33_C4), and an aggregated access based on membership in both an unconstrained security group and a constrained security group (SG2_C5&SG7).

A user belonging to group SG22 or a user belonging to group SG33 and a constraining context of C4 is able to search for this record via its "Title" field, but only a user belonging to group SG22 is able to search for this record via its "ID" field. This record's existence is visible to both of these security groups. A user belonging to group SG22 uses unconstrained access while a user of group SG33 requires the additional constraining context of C4 for access. Similarly, a user that belongs to both group SG7 and also group SG2 with the additional constraint of C5, can search by either "Title" or "ID" and this record is visible to them.

In some embodiments, a search user is expected to enter a simple text string of key words to search. The search system then modifies this query so that the proper security checks are included. This is done by using the index definition for the record type to understand the configured record and field security groups, and the search user's security group memberships. The basic logic used to expand the query is:

For each doc_type and each record of that type

```
((is this record visible to the search user?) AND
(for each field within record
    ((is this field visible to the search user?) AND
    (for each search term in query
        (does search term = field value?)
    )))
)))
```

Return the list of records that match the search terms within the visible fields In some embodiments, an example query set up and execution:

Assume user belongs to Security Groups=SG77, SG88, and SG33_C4
  In SG77 and SG88, the user has unconstrained access.
  In SG33, the user is constrained to only documents or fields that have the further constraint of C4 (whatever that is defined to be within data model).
  The user does not belong to any aggregation security.
Assume no tokenization of security group identifiers
User's typed in search: gift 13 hrcore
Assume we want to find a match for any token user typed
  (relevancy will put the best matches at the top of the result list)

Here is the example query using a pseudo-query language after query expansion, including comments marked by double slash (//) to help provide clarity:

```
((12345:SG77 OR 12345:SG88 OR 12345:SG33_C4) // Record visibility?
AND( // Field 1 checks
    ((12345$1:field_security:SG77 OR 12345$1:field_security:SG88 OR
    12345$1:field_security:SG33_C4)
    AND
    (12345$1:value:"gift" OR 12345$1:value:"13" OR 12345$1:value:"hrcore"))
OR // Field 2 checks
    ((12345$2:field_security:SG77 OR 12345$2:field_security:SG88 OR
    12345$2:field_security:SG33_C4)
    AND
    (12345$2:value:"gift" OR 12345$2:value:"13" OR 12345$2:value:"hrcore"))
))
```

In the check for record visibility, record 1111 matched on 12345:SG33_C4, so it is visible. We continue checking this record for field matches.
In the check for visibility on Field 1, there are no matches, so we move on to next field since we must match on both security groups and field values.
In the check for visibility on Field 2, record 1111 matches on 12345$2:field_security:SG33_C4, so we then check on matching the values for Field 2.
In the check for values on Field 2, record 1111 matches on "gift", "13', and "hrcore". Matching on any of these values would be considered a match from the assumptions given for this example.
Record 1111 would be placed on the list of records to be returned.

In some embodiments, performance comes from standard query optimizations of the above logic and the indexing of security and field value information for near direct lookup.

FIG. 1 is a block diagram illustrating an embodiment of an indexing system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and database system 106 communicate via network 100. In various embodiments, administrator system 102 comprises a system for an administrator to access data on database system 106, to create data structures on database system 106, to indicate removal of data structures on database system 106, or for any other appropriate purpose. User system 104 comprises a system for a user. In some embodiments, user system 104 comprises a system for accessing database system 106. In some embodiments, a user using user system 104 is associated with security information (e.g., describing data the user is or is not allowed to access). Database system 106 comprises a system for managing a database. In some embodiments, database system 106 comprises a system for managing an object-based database. In some embodiments, database system 106 comprises a system for storing data provided by a user (e.g., via user system 104 and network 100). In some embodiments, database system 106 comprises a system for searching data.

Figure 2:
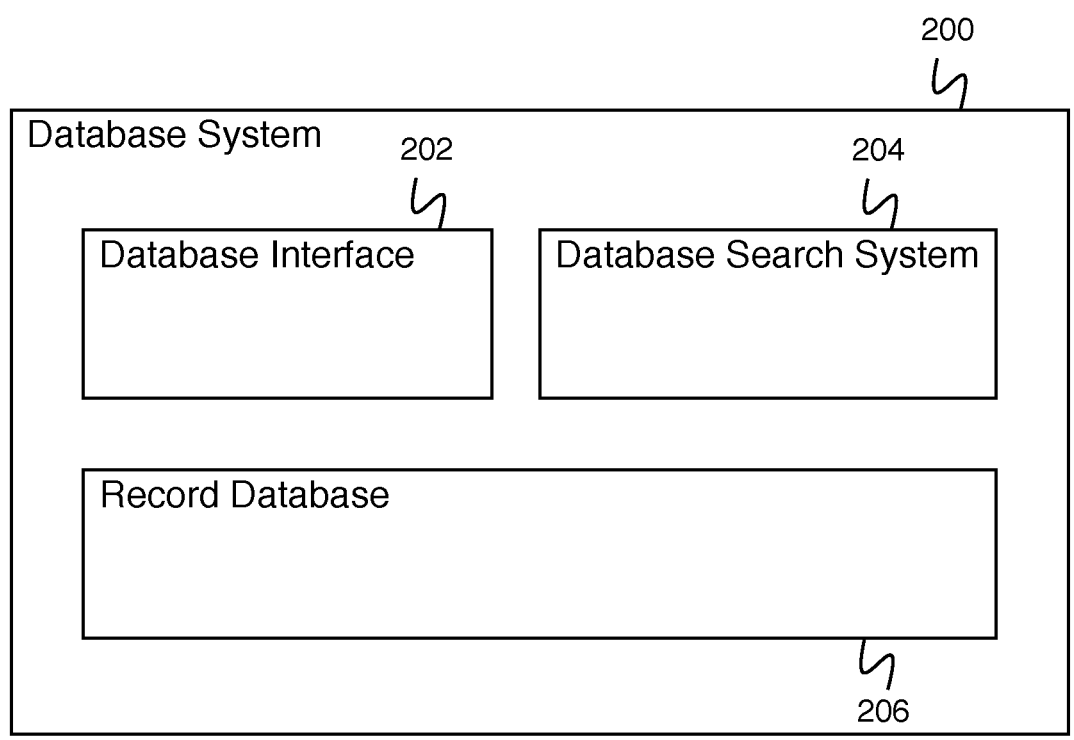
FIG. 2 is a block diagram illustrating an embodiment of a database system.

FIG. 2 is a block diagram illustrating an embodiment of a database system. In some embodiments, database system 200 of FIG. 2 comprises database system 106 of FIG. 1. In the example shown, database system 200 comprises database interface 202. In various embodiments, database interface 202 comprises a database interface for receiving requests to retrieve data from database system 200, receiving data to store in database system 200, receiving search queries for database system 200, providing data from database system 200, providing search results from database system 200, or for any other appropriate database communication. Record database 206 comprises a data store for storing records. In some embodiments, record database 206 comprises a hierarchical object tree. In some embodiments, records comprise instances of record types. Each record comprises a record type identifier (e.g., identifying which record type the record is) and a record identifier (e.g., identifying which instance of the record type the record is). A record comprises a set of record fields. Each record field comprises a record field identifier (e.g., identifying which record field of the record the record field is) and record field data. In some embodiments, a record field identifier comprises a numerical record field identifier (e.g., record field 001, record field 002, etc.). In some embodiments, a record field identifier comprises a record field type (e.g., "Name", "Cost", "Location", etc.). In some embodiments, a record comprises security (e.g., an indication of one or more groups of users that are able to view the record). In some embodiments, a record field additionally comprises security (e.g., an indication of one or more groups of users that are able to view the record field). Database search system 204 comprises a database search system for searching record database 206. In some embodiments, database search system 204 provides an indication of one or more records (e.g., records stored in record database 206) in response to a search query comprising one or more search terms. In some embodiments, database search system 204 determines the records based at least in part on a search term matching record field data and on a security policy (e.g., database search system 204 only provides a record to a user based on a search term in the event that the user is allowed to view the record field of the record matching the search term). In some embodiments, database search system 204 builds an index of information stored in record database 206. In some embodiments, database system 200 comprises a processor and a memory coupled to the processor that is configured to provide the processor with instructions.

Figure 3:
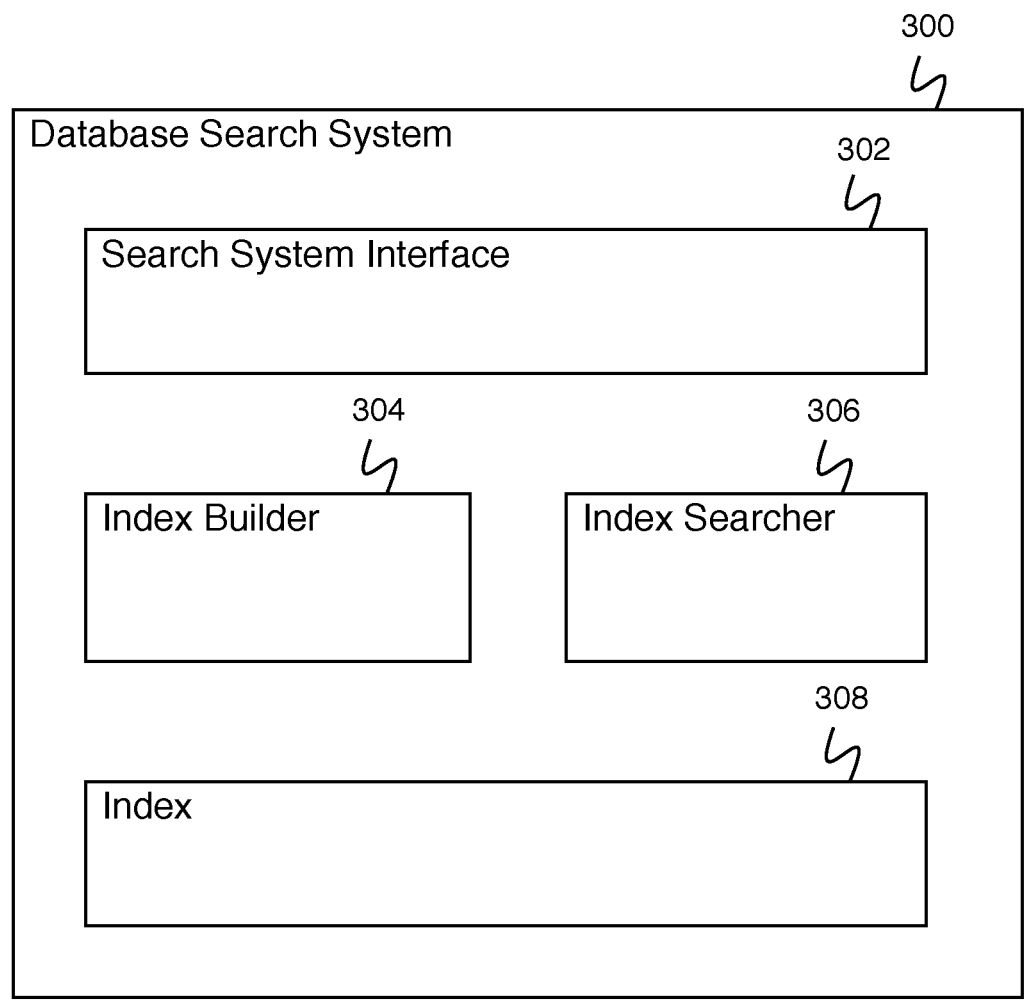
FIG. 3 is a block diagram illustrating an embodiment of a database search system.

FIG. 3 is a block diagram illustrating an embodiment of a database search system. In some embodiments, database search system 300 comprises database search system 204 of FIG. 2. In the example shown, database search system 300 comprises search system interface 302. In various embodiments, search system interface 302 comprises an interface for receiving search requests, for receiving records for indexing, for receiving user information, for providing search results, or for any other appropriate search system interface action. In some embodiments, search system interface 302 is implemented using a processor. Index builder 304 comprises an index builder for building an index (e.g., index 308). In some embodiments, index builder 304 receives record information (e.g., from records stored in a record database, e.g., record database 206). In some embodiments, index builder creates index fields from record information and stores the index fields in index 308. In some embodiments, index fields comprise security (e.g., metadata indicating security access permissions). In some embodiments, index builder 304 is implemented using a processor. Index searcher 306 comprises an index searcher for searching an index (e.g., index 308). In some embodiments, index searcher 306 receives a search query comprising one or more search terms. In some embodiments, index searcher 306 receives security information associated with the search query (e.g., security information associated with a user making the query). Index searcher determines a search result (e.g., a set of data records) in response to a search query. In some embodiments, the search result comprises the set of data records comprising data field values matching a search term. In some embodiments, the search result comprises only data records that the user is allowed to access (e.g., according to security information associated with the search query). Index 308 comprises a search index. In some embodiments, index 308 is built from a record database (e.g., record database 206 of FIG. 2). In some embodiments, index 308 comprises a set of index fields (e.g., data fields associated with record fields stored in a record database). In some embodiments, each index field of index 308 comprises security information. In some embodiments, index 308 comprises a flat (e.g., non-hierarchical) index. In some embodiments, index 308 is implemented using a processor. In various embodiments, the elements of database search system are implemented using a single processor, each using its own processor, or combined onto two or more processors in any appropriate way. In some embodiments, database search system 300 comprises a memory coupled to the one or more processors and configured to provide the one or more processors with instructions. In various embodiments, the memory comprises a magnetic memory, an optical memory, a solid-state memory, a flash memory, a non-volatile memory, a read-only memory, a tape memory, a disc memory, or any other appropriate memory.

Figure 4:
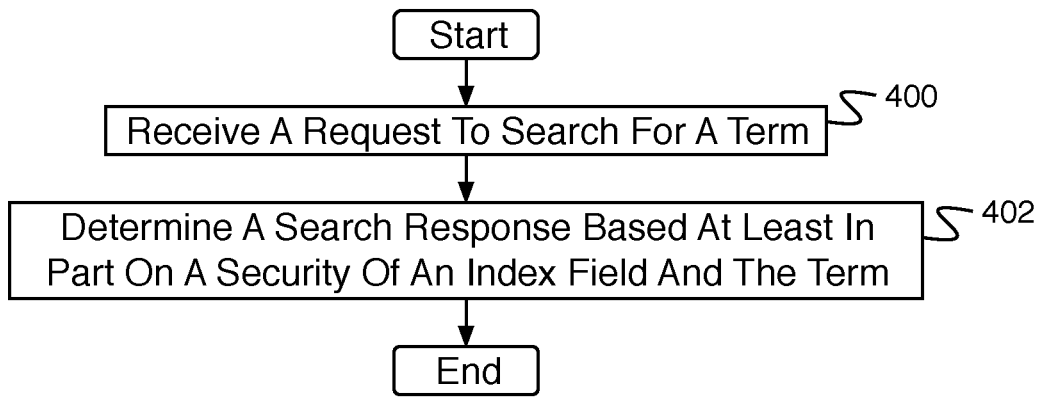
FIG. 4 is a flow diagram illustrating an embodiment of a process for searching.

FIG. 4 is a flow diagram illustrating an embodiment of a process for searching. In some embodiments, the process of FIG. 4 is executed by index searcher 306 of FIG. 3. In the example shown, in 400, a request is received to search for a term. In some embodiments, the request comprises multiple terms. In some embodiments, the request comprises security information. In 402, a search response is determined based at least in part on a security of an index field and the term. In some embodiments, the index field comprises part of an index. In some embodiments, the index comprises a set of index fields. In some embodiments, the index field is associated with an instance of a record. In some embodiments, the instance of the record is associated with an identifier. In some embodiments, the instance of the record comprises security. In some embodiments, the record is associated with an identifier. In some embodiments, the index field is associated with a record field of the instance of the record. In some embodiments, the record field comprises a record field value. In some embodiments, the record field comprises security. In some embodiments, the security of an index field is based at least in part on a security of an instance of a record and a security of an instance of a record field. In some embodiments, the index field comprises an index field value. In some embodiments, the index field value is associated with a record field value.

Figure 5:
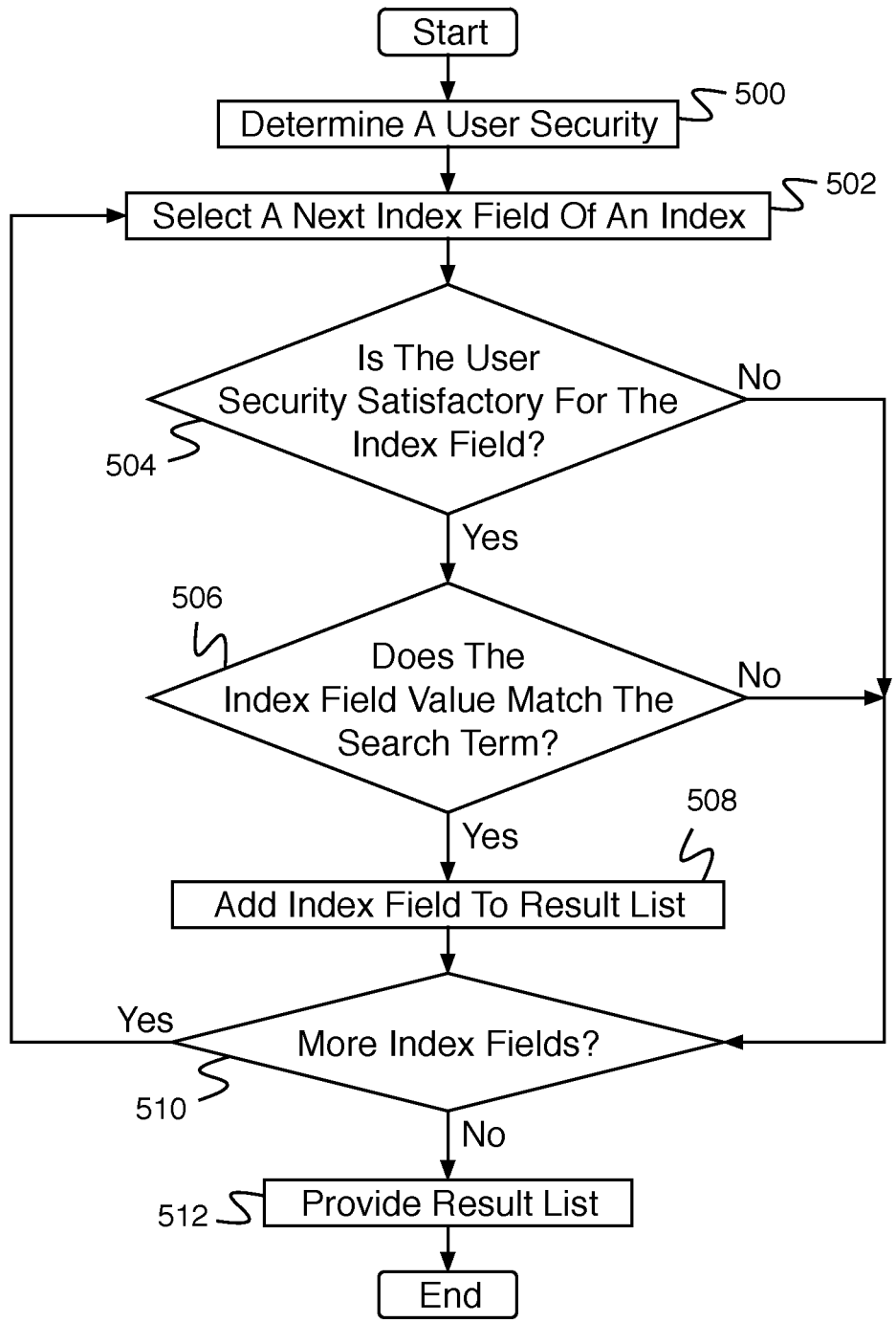
FIG. 5 is a flow diagram illustrating an embodiment of a process for determining a search response based at least in part on a security of an index field and a term.

FIG. 5 is a flow diagram illustrating an embodiment of a process for determining a search response based at least in part on a security of an index field and a term. In some embodiments, the process of FIG. 5 implements 402 of FIG. 4. In the example shown, in 500, a user security is determined. In some embodiments, the user security is associated with a request to search for a term. In some embodiments, determining a user security comprises determining a user associated with a search request. In some embodiments, determining a user security comprises determining a security associated with a user. In some embodiments, a search term is associated with a search term field identifier (e.g., indicating the record field identifier the index field is associated with). In 502, a next index field of an index is selected. In some embodiments, the next index field comprises the first index field. In 504, it is determined whether the user security is satisfactory for the index field. In some embodiments, determining whether the user security is satisfactory for the index field comprises determining a security associated with the index field and determining whether the user security is satisfactory for the security associated with the index field (e.g., the index field is associated with a security group and the user is associated with the security group). In the event it is determined that the user security is not satisfactory for the index field, control passes to 510. In the event it is determined that the user security is satisfactory for the index field, control passes to 506. In 506, it is determined whether the index field value matches the search term. In some embodiments, determining whether the index field value matches the search term comprises comparing the index field value and the search term. In some embodiments, determining whether the index field value matches the search term comprises determining whether a search term field identifier matches a record field identifier associated with the index field. In the event it is determined that the index field value does not match the search term, control passes to 510. In the event it is determined that the index field value matches the search term, control passes to 508. In 508, the index field is added to a result list. In various embodiments, adding an index field to a result list comprises copying index field data to the result list, copying a record identifier to the result list, copying a record instance identifier to the result list, copying a record field identifier to the result list, or adding the index field to the result list in any other appropriate way. In 510, it is determined whether there are more index fields. In the event it is determined that there are more index fields, control passes to 502. In the event it is determined that there are not more index fields, control passes to 512. In 512, the result list is provided.

Figure 6:
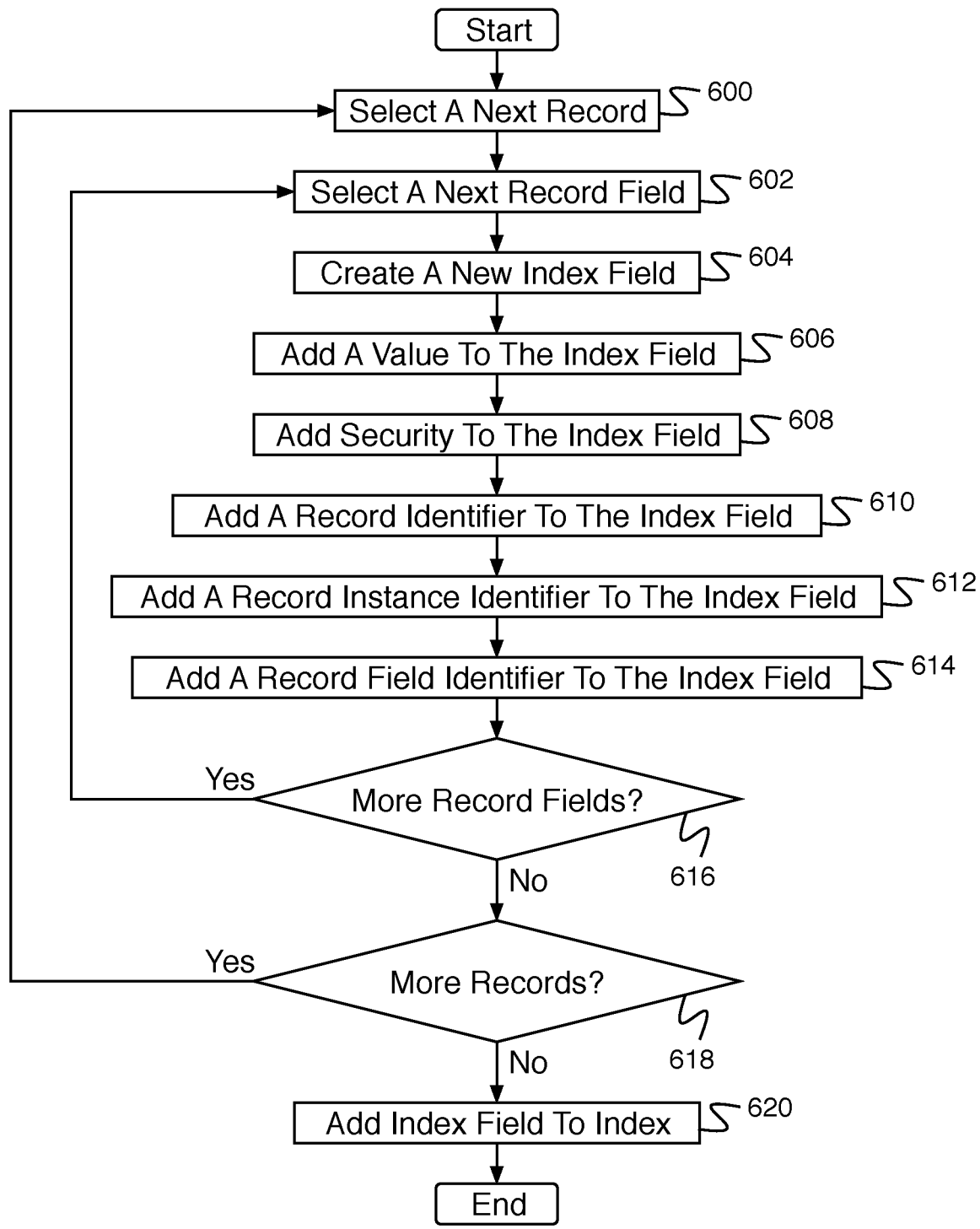
FIG. 6 is a flow diagram illustrating an embodiment of a process for building an index.

FIG. 6 is a flow diagram illustrating an embodiment of a process for building an index. In some embodiments, the process of FIG. 6 is executed by an index builder (e.g., index builder 304 of FIG. 3). In some embodiments, the process of FIG. 6 builds an index (e.g., index 308 of FIG. 3) from a record database (e.g., record database 206 of FIG. 2). In some embodiments, the process of FIG. 6 adds one or more index fields to an index, each index field associated with a record. In the example shown, in 600, a next record (e.g., a next record of a record database, a next record of a set of one or more records, etc.) is selected. In some embodiments, the next record comprises the first record. In some embodiments, the next record comprises the only record. In 602, a next record field is selected (e.g., a next record field of the record). In some embodiments, the next record field comprises the first record field. In 604, a new index field is created (e.g. a new index field with no information stored associated with it). In 606, a value is added to the index field. In some embodiments, the value comprises the value associated with the selected record field. In 608, security is added to the index field. In various embodiments, the security comprises the security associated with the record field, the security associated with the record, a combination of the security associated with the record field and the security associated with the record, or any other appropriate security. In some embodiments, security is determined by combining the record field security and the record security. In some embodiments, security is determined by determining the intersection of the record field security and the record security. In 610, a record identifier is added to the index field. In some embodiments, the record identifier comprises the record identifier associated with the selected record. In 612, a record instance identifier is added to the index field. In some embodiments, the record instance identifier comprises the record instance identifier associated with the selected record. In 614, a record field identifier is added to the index field. In some embodiments, the record field identifier comprises the record field identifier associated with the selected record field. In 616, it is determined whether there are more record fields (e.g., associated with the selected record). In the event it is determined that there are more record fields, control passes to 602. In the event it is determined that there are not more record fields, control passes to 618. In 618, it is determined whether there are more records (e.g., more records associated with the record database). In the event it is determined that there are more records, control passes to 600. In the event it is determined that there are not more records, control passes to 620. In 620, the index field is added to the index. In some embodiments, in the event a new record or a new set of records is added to the record database, an index field corresponding to the record is added to the index using the process of FIG. 6.

Figure 7:
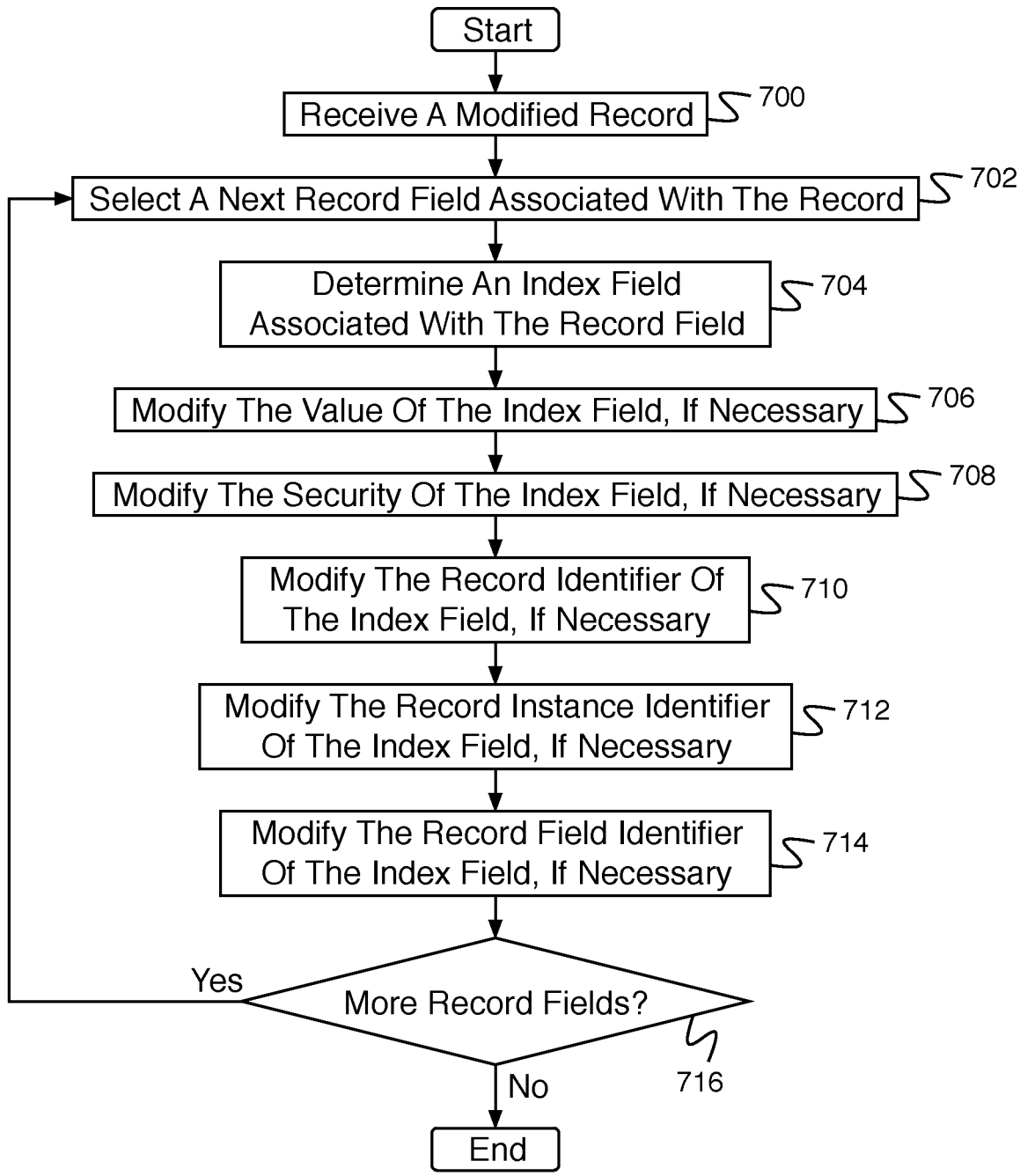
FIG. 7 is a flow diagram illustrating an embodiment of a process for modifying an index field of an index.

FIG. 7 is a flow diagram illustrating an embodiment of a process for modifying an index field of an index. In some embodiments, the process of FIG. 6 is executed by an index builder (e.g., index builder 304 of FIG. 3). In some embodiments, the process of FIG. 6 modifies one or more index fields of an index in response to receiving a modified record from a record database. In some embodiments, in the event a record field of an instance of a record is changed, an index field is changed. In the example shown, in 700, a modified record is received. In 702, a next record field associated with the record is selected. In 704, an index field associated with the record field is determined. In 706, the value of the index field is modified, if necessary. In 708, the security of the index field is modified, if necessary. In 710, the record identifier of the index field is modified, if necessary. In 712, the record instance identifier of the index field is modified, if necessary. In 714, the record field identifier of the index field is modified, if necessary. In 716, it is determined whether there are more record fields (e.g., associated with the modified record). In the event it is determined that there are more record fields, control passes to 702. In the event it is determined that there are not more record fields, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for indexing and searching, comprising:
an input interface to receive a query to search for a term; and
a processor to determine a response to the query based at least in part on the term and an index field of a search index, wherein the index field comprises an index field value associated with a record field of a record and a security policy associated with the record and the record field, wherein the security policy comprises a first set of security groups for visibility of the record and a second set of security groups for visibility of the record field, wherein determining the response to the query comprises to:
determine a user security associated with the query to search for the term, wherein the user security includes a set of user security groups associated with a user;
modify the query, using the index field, to determine an expanded query that includes checks to perform record matching and field visibility matching of the record field to provide the record for the response to the query to search for the term, wherein the expanded query comprises the first set of security groups for visibility of the record, the second set of security groups for visibility of the record, and a set of tokenized values of the index field;

determine, using the expanded query, whether both the record and the record field are visible to the user, comprising determining the first set of security groups for visibility of the record includes a first at least one user security group of the set of user security groups and the second set of security groups for visibility of the record field of the record includes a second at least one user security group of the set of user security groups;

in response to a determination that both the record and the record field are visible to the user, determine, using the expanded query, whether the term matches the index field; and in response to a determination that the term matches the index field value, field, include the record in the response to the query to search for the term, wherein the record in the response is obtained using the expanded query.

2. The system of claim 1, wherein the index field comprises part of the search index.

3. The system of claim 1, wherein the search index comprises a set of index fields.

4. The system of claim 1, wherein the index field is associated with an instance of the record.

5. The system of claim 4, wherein the instance of the record is associated with an identifier.

6. The system of claim 1, wherein the record is associated with an identifier.

7. The system of claim 4, wherein the index field is associated with an instance of the record field of the instance of the record.

8. The system of claim 7, wherein the instance of the record field comprises a record field value.

9. The system of claim 8, wherein the field is associated with the record field value.

10. The system of claim 1, wherein in the event that the record field of the record is created, the index field is added to the search index.

11. The system of claim 10, wherein adding the index field comprises queuing adding the index field.

12. The system of claim 10, wherein adding the index field comprises adding the index field.

13. The system of claim 10, wherein adding the index field comprises adding the security policy of the index field.

14. The system of claim 1, wherein the security policy is determined by combining the security groups for visibility of the record and the security groups for visibility of the record field of the record.

15. The system of claim 10, wherein adding the index field comprises adding a record identifier.

16. The system of claim 10, wherein adding the index field comprises adding a record instance identifier.

17. The system of claim 10, wherein adding the index field comprises adding a numerical record field identifier.

18. The system of claim 7, wherein in the event that the instance of the record field of the instance of a record is changed, the index field is changed.

19. A method for indexing and searching, comprising:
receiving a query to search for a term; and
determining, using a processor, a response to the query based at least in part on the term and an index field of a search index, wherein the index field comprises an index field value associated with a record field of a record and a security policy associated with the record and the record field, wherein the security policy comprises a first set of security groups for visibility of the record and a second set of security groups for visibility of the record field, wherein determining the response to the query comprises:

determining a user security associated with the query to search for the term, wherein the user security includes a set of user security groups associated with a user;

modifying the query, using the index field, to determine an expanded query that includes checks to perform record matching and field visibility matching of the record field to provide the record for the response to the query to search for the term, wherein the expanded query comprises the first set of security groups for visibility of the record, the second set of security groups for visibility of the record, and a set of tokenized values of the index field;

determining, using the expanded query, whether both the record and the record field are visible to the user, comprising determining the first set of security groups for visibility of the record includes a first at least one user security group of the set of user security groups and the second set of security groups for visibility of the record field of the record includes a second at least one user security group of the set of user security groups;

in response to a determination that both the record and the record field are visible to the user, determining, using the expanded query, whether the term matches the index field and in response to a determination that the term matches the index field, including the record in the response to the query to search for the term, wherein the record in the response is obtained using the expanded query.

20. A computer program product for indexing and searching, the computer program product being embodied in a non-transitory computer readable storage medium and comprising computer instructions for:

receiving a query to search for a term; and
determining a response to the query based at least in part on the term and an index field of a search index, wherein the index field comprises an index field value associated with a record field of a record and a security policy associated with the record and the record field, wherein the security policy comprises a first set of security groups for visibility of the record and a second set of security groups for visibility of the record field, wherein determining the response to the query comprises:

determining a user security associated with the query to search for the term, wherein the user security includes a set of user security groups associated with a user;

modifying the query, using the index field, to determine an expanded query that includes checks to perform record matching and field visibility matching of the record field to provide the record for the response to the query to search for the term, wherein the expanded query comprises the first set of security groups for visibility of the record, the second set of security groups for visibility of the record, and a set of tokenized values of the index field;

determining, using the expanded query, whether both the record and the record field are visible to the user, comprising determining the first set of security groups for visibility of the record includes a first at least one user security group of the set of user security groups and the second set of security groups for visibility of the record field of the record includes a second at least one user security group of the set of user security groups;

in response to a determination that both the record and the record field are visible to the user, determining, using the expanded query, whether the term matches the index field; and in response to a determination that the term matches the index field, including the record in the response to the query to search for the term, wherein the record in the response is obtained using the expanded query.

* * * * *